J. C. HOLLINGSWORTH.
COTTON GIN.
APPLICATION FILED AUG. 1, 1910.

1,006,092.

Patented Oct. 17, 1911.

2 SHEETS—SHEET 1.

WITNESSES:

INVENTOR
J. C. Hollingsworth
BY
ATTORNEYS

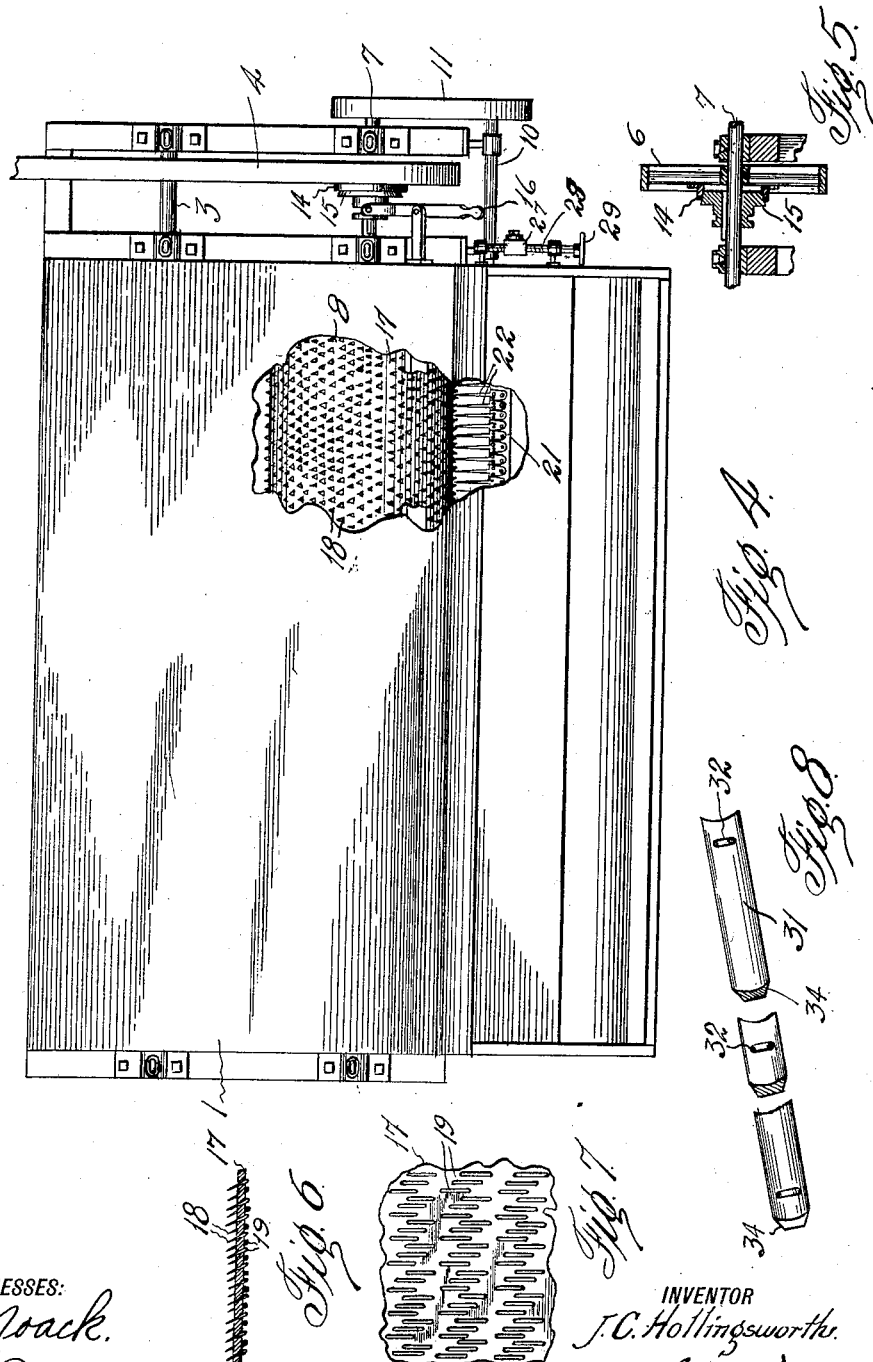

UNITED STATES PATENT OFFICE.

JOSEPH C. HOLLINGSWORTH, OF DALLAS, TEXAS.

COTTON-GIN.

1,006,092.  Specification of Letters Patent.  Patented Oct. 17, 1911.

Application filed August 1, 1910. Serial No. 574,790.

*To all whom it may concern:*

Be it known that I, JOSEPH C. HOLLINGSWORTH, citizen of the United States, residing at Dallas, in the county of Dallas and State of Texas, have invented certain new and useful Improvements in Cotton-Gins, of which the following is a specification.

This invention has relation to cotton gins and particularly to that class employing ginning-points instead of saws.

The object of the invention is to provide a ginning cylinder having ginning-points extending obliquely to the surface of the cylinder and disposed in staggered relation longitudinally of the cylinder, but in rows circumferentially thereof, although the circumferential rows are not essential to the operation of the cylinder.

Further objects of the invention are to provide a reversible seed bar whereby seeds are stripped from the ginning cylinder; and an adjustable seed grate comprising a plurality of fingers directed toward the ginning cylinder terminating in close proximity to the ginning-points.

Finally the object of the invention is to provide means of the character described that will be strong, durable, efficient, and easy of operation, simple and comparatively inexpensive to construct, and also in which the several parts will not be likely to get out of working order.

Figure 1:
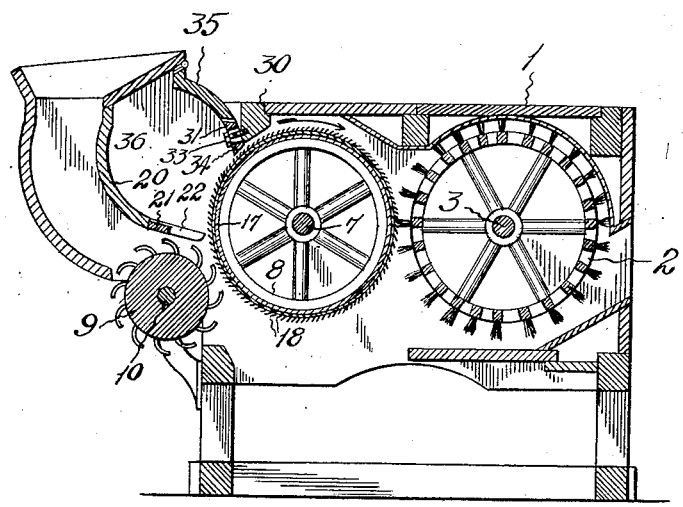
Figure 2:
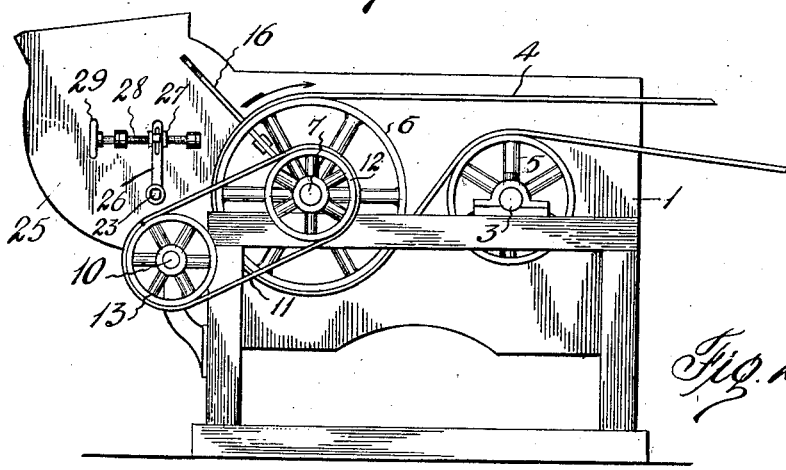
Figure 3:
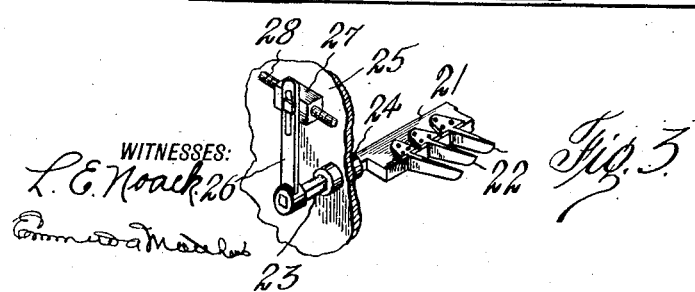

With the above and other objects in view, the invention has relation to certain novel features of construction and operation, an example of which is described in this specification and illustrated in the accompanying drawings, wherein:

Figure 1. is a transverse vertical sectional view of a gin stand showing my invention embodied therein, Fig. 2. is an end elevation of the same, Fig. 3. is a detail of the seed grate in perspective, Fig. 4. is a plan view with a portion broken away to show underlying parts, Fig. 5. is a detail of the clutch in section, Fig. 6. is a sectional detail of the flexible covering of the ginning cylinder showing the ginning-points, Fig. 7. is an underside view of the same, and Fig. 8. is a detail in perspective of the seed bar.

In the drawings the numeral 1 designates a gin stand in which a brush 2 of the ordinary open construction is secured on the shaft 3 and is driven by the belt 4 which passes over the brush pulley 5 and around a pulley 6 carried on a shaft 7. This shaft 7 also carries a ginning cylinder 8 which is revolved in the same direction as the pulley 6 as indicated by the arrows in Figs. 1 and 2. A huller-roller 9 is mounted in the stand on a shaft 10. This roller is driven in the same direction as the ginning cylinder by a belt 11 which travels about pulleys 12 and 13 mounted on the outer ends of the shafts 7 and 10 respectively. For stopping and starting the ginning cylinder and the huller-roller, a friction clutch ring 14 is secured to the pulley 6 and adapted to be engaged by a tapered clutch member 15 splined on the shaft 7 and operated by a lever 16 supported on the gin stand. The ginning cylinder 8 is formed of suitable material and has a smooth periphery or outer surface, preferably without grooves or projections. About this cylinder a covering or casing 17 of leather or other suitable material is stretched and tightly secured over the surface. While I prefer to make the covering 17 of leather and in one or more pieces, it is to be understood that any material suitable for the purpose may be employed. From this covering ginning-points or pins 18 extend obliquely so as to incline toward the direction of rotation of the cylinder. These pins are tapered so as to terminate at their upper ends in comparatively fine points. While the pins may be secured in the covering in various ways I prefer to employ a formation similar to an ordinary staple and pass the prongs of the same through the covering from the underside as indicated at 19 in Figs. 6 and 7, the prongs producing the pins or ginning-points. The pins as shown in the drawings are disposed in staggered relation and in rows circumferentially of the ginning cylinder. It is not necessary or even essential that the pins be disposed in circumferential rows as there is no part of the gin which projects between the pins and they may if desired be set in any order.

At the lower end of the inner breast 20 a grate bar 21 is disposed parallel to the shaft 7 and is provided with a plurality of spaced fingers 22 extending toward the ginning cylinder. One end of the bar 21 is squared at 23 (Fig. 3) and passes through a sleeve 24 mounted in the end wall 25 of the gin stand. On the portion 23 the lower end of an upwardly extending lever 26 is secured. This lever has slotted engagement with an adjusting block 27 through which a screw 28 fastens. This screw is operated by a hand wheel 29 mounted on the end wall 25 as shown in Fig. 2. By adjusting the screw the grate bar and its fingers, which I have termed a "seed grate," is swung, that is the ends of the fingers 22 are swung toward or away from the ginning cylinder according to the direction in which the screw is turned. This adjustment is made according to the condition of the cotton which varies.

To the front side of the breast beam 30 a seed bar 31 is secured. As shown in Fig. 8 this bar has vertical slots 32 at each end and in the center and through which slots screws 33 are passed and engaged in the beam 30. The edges of the bar are beveled at 34 and the face of the bar is concaved contiguous to the wall 35 of the roll box 36. The edges 34 of the bar are inclined or beveled so that the ginning-points will pass across the adjacent edge and at all times be substantially equi-distant therefrom. By having both edges beveled the bar may be reversed when one edge wears and the slots 32 permit an adjustment of the bar to and from the ginning cylinder.

The operation of the gin is as follows: The cotton is fed into the outer breast and is by the huller roller 9 thrown against the ginning cylinder and carried up by the ginning-points or pins 18. The trash and some of the seeds will be thrown off and drop out at this point. The cotton is carried up by the pins 18 to the seed bar 31 which separates the seed therefrom. Those seeds which are free from lint will drop upon the grate bar and through the same. It will be noted that as the cotton passes upward from the roller 9, the fingers 22 will have a tendency to separate the seeds from the cotton. The seeds that are not entirely free from the lint will be stripped from the ginning cylinder by the seed bar and taken up by the roll of cotton in the roll box and again presented to the ginning cylinder until they are free from lint and drop through the grate. The lint that has been entirely freed from seeds is carried under the seed bar and removed from the ginning cylinder by the action of the brush 2, from which it is removed and carried to the gin flue in the usual manner.

I desire to call attention to the fact that there are no ribs or fingers extending between the ginning pins and therefore the entire surface of the ginning cylinder is available for ginning purposes. This arrangement gives the gin a greater capacity and reduces the number of parts which are worn by frictional contact with other parts.

What I claim is:

1. In a cotton gin, the combination of, a ginning cylinder having a covering, ginning pins secured to the cover and inclining therefrom, a seed bar mounted in close proximity to the ginning points above the center of the cylinder, a seed grate having fingers extending toward the ginning pins from a point in front of the cylinder, and a huller roller mounted under the seed grate.

2. The combination with a ginning cylinder having inclined ginning pins, the inner breast of a gin, and a huller roller mounted adjacent the cylinder and immediately below the inner breast, of a grate bar mounted at the lower end of the front wall of the inner breast and over the huller roller, said bar being provided with fingers projecting toward and terminating in close proximity to the ginning pins of the cylinder, and a seed bar having its lower edge in juxtaposition to the said ginning pins.

In testimony whereof I have signed my name to this specification in the presence of two subscribing witnesses.

JOSEPH C. HOLLINGSWORTH.

Witnesses:
   JACK A. SCHLEY,
   Z. M. DUCKWORTH.